US012626529B2

(12) United States Patent
Inagaki et al.

(10) Patent No.: US 12,626,529 B2
(45) Date of Patent: May 12, 2026

(54) CHARACTER DETERMINATION SYSTEM AND CHARACTER DETERMINATION METHOD

(71) Applicant: Anicom Holdings, Inc., Tokyo (JP)

(72) Inventors: Tsuguna Inagaki, Tokyo (JP);
Hiroyuki Takahashi, Tokyo (JP);
Yoshie Ogoshi, Tokyo (JP)

(73) Assignee: ANICOM HOLDINGS, INC., Tokyo (JP)

( * ) Notice: Subject to any disclaimer, the term of this patent is extended or adjusted under 35 U.S.C. 154(b) by 0 days.

(21) Appl. No.: 18/705,152

(22) PCT Filed: Oct. 26, 2022

(86) PCT No.: PCT/JP2022/039913

§ 371 (c)(1),
(2) Date: Apr. 26, 2024

(87) PCT Pub. No.: WO2023/074736

PCT Pub. Date: May 4, 2023

(65) Prior Publication Data

US 2024/0331437 A1     Oct. 3, 2024

(30) Foreign Application Priority Data

Oct. 29, 2021     (JP) ................................. 2021-177839

(51) Int. Cl.
*G06V 40/10*          (2022.01)
*A01K 29/00*          (2006.01)
*G06V 10/70*          (2022.01)

(52) U.S. Cl.
CPC ............ *G06V 40/103* (2022.01); *A01K 29/00* (2013.01); *G06V 10/70* (2022.01); *G06V 40/10* (2022.01)

(58) Field of Classification Search
CPC ............................ G06V 40/103; G06V 10/70
See application file for complete search history.

(56) References Cited

U.S. PATENT DOCUMENTS 9,104,906 B2 *   8/2015   McVey ................. G06T 7/0014
11,574,430 B2 *   2/2023   Kwon ........................ G06T 3/00
(Continued)

FOREIGN PATENT DOCUMENTS

JP          2006-185394 A          7/2006
JP          2009-165416 A          7/2009
(Continued)

OTHER PUBLICATIONS

Decision to Grant a Patent issued in Japanese Patent Application No. 2021-177839, dated Nov. 30, 2022.
(Continued)

*Primary Examiner* — Kenny A Cese
(74) *Attorney, Agent, or Firm* — Birch, Stewart, Kolasch & Birch, LLP

(57)          ABSTRACT

An object of the present invention is to provide a character determination system and the like which determine a character of an animal with a simple method. The character determination system includes: receiving means which receives an input of an image of an animal; and character determining means which determines, using a trained model, a character of the animal from the image of the animal inputted to the receiving means, wherein the trained model is a trained model having learned a relationship between an image of an animal and a character of the animal.

18 Claims, 4 Drawing Sheets

(56) References Cited

U.S. PATENT DOCUMENTS

| | | | | |
|---|---|---|---|---|
| 2013/0259332 A1* | 10/2013 | Mcvey | ............... | G06V 40/171 |
| | | | | 382/128 |
| 2014/0316216 A1 | 10/2014 | Kojima et al. | | |
| 2019/0286910 A1* | 9/2019 | Zimmerman | .......... | G06V 20/20 |
| 2021/0049355 A1* | 2/2021 | Choi | ................... | G06F 18/2413 |
| 2022/0054532 A1* | 2/2022 | Smith | ..................... | A61P 29/00 |
| 2022/0087229 A1* | 3/2022 | Wernimont | .......... | A61B 5/7282 |
| 2022/0104464 A1* | 4/2022 | Wernimont | .......... | A61B 5/7267 |
| 2022/0391757 A1 | 12/2022 | Komori et al. | | |
| 2023/0073738 A1* | 3/2023 | Wernimont | ............ | G06V 10/25 |
| 2023/0092647 A1* | 3/2023 | Mundell | .............. | A01K 29/005 |
| | | | | 119/712 |

FOREIGN PATENT DOCUMENTS

| | | |
|---|---|---|
| JP | 2014-223063 A | 12/2014 |
| JP | 2018-195099 A | 12/2018 |
| JP | 2019-195295 A | 11/2019 |
| JP | 2021-68382 A | 4/2021 |
| JP | 2021-136868 A | 9/2021 |

OTHER PUBLICATIONS

Furusho et al., "Social Psychology of Zoological Gardens (2): Personality traits inference of animals bred in the zoo", DWCLA human life and science, vol. 51, 2017, pp. 1-16.
International Search Report (PCT/ISA/210) issued in PCT/JP2022/039913, dated Jan. 10, 2023.
Notice of Reasons for Refusal issued in Japanese Patent Application No. 2021-177839, dated Sep. 27, 2022.
Written Opinion of the International Searching Authority (PCT/ISA/237) issued in PCT/JP2022/039913, dated Jan. 10, 2023.
Yamashita et al., "Predicting Demographics and Personalities from Profile Images of Social Network Users using Convolutional Deep Neural Network", Proceedings of the 30th Annual Conference of JSAI, 2016, pp. 1-4.

* cited by examiner

CHARACTER DETERMINATION SYSTEM AND CHARACTER DETERMINATION METHOD

TECHNICAL FIELD

The present invention relates to a character determination system and a character determination method and, more specifically, to a character determination system and a character determination method which provide a determination result of a character of an animal from an image of the animal.

BACKGROUND ART

Pets such as dogs, cats, and rabbits are irreplaceable to humans and various pet-oriented services are being promoted and developed.

Each pet is an individual with a its own personality which differ from one individual to the next even in a same species or a same breed. In addition, the character of an animal is correlated to compatibility of the animal with a pet owner and how easily the animal can be reared. For example, rearing becomes difficult if an animal has an aggressive character but an animal with an outgoing character can be readily taken to places where other animals are present.

If a character of an animal can be known by a simple method, for example, a customer about to purchase the animal for rearing will find that such information is useful. While an animal is generally purchased at pet shops or through breeders, since a decision to purchase an animal is usually made in a short amount of time at a pet shop, there is not enough time to assess a character of the animal. A similar situation occurs when purchasing an animal from a breeder. Recently, information on animals being sold by pet shops and breeders including a breed, a headshot, an age in months, and a price of the animals are made available through the Internet and prospective purchasers increasingly visit an actual pet shop or a breeder where an individual of interest is being sold only after due deliberation based on the information available on the Internet. In such a case, making information on a character of an individual available on the Internet in addition to information such as the breed, the headshot, the age in months, and the price of the animal is expected to help a pet owner with making a selection and prevent a mismatch between the owner and the animal.

Even a pet owner already rearing an animal will conceivably benefit from gaining knowledge of a character of the individual being reared. Since animals are unable to speak, an animal's actual character may differ from the character of the animal as perceived by the owner.

In such a case, conceivably, there is a greater need for comprehending a tendency of a character of an animal by a simple method rather than comprehending the character based on a detailed analysis. Accordingly, there is a demand for means which determines a character of an animal with a simple method.

While Patent Literature 1 discloses a character analysis apparatus and a character analysis program which aim to more accurately analyze a character of a user viewing a web page using information on behavioral characteristics of the user, there is no disclosure on character determination of animals.

In addition, while Non Patent Literature 1 discloses an attribute determination method of a poster from an SNS profile image using deep learning, there is no disclosure on character determination of animals.

RELATED ART DOCUMENTS

Patent Document

Patent Literature 1: JP2018-195099

Non-Patent Document

Non Patent Literature 1: Yuta Yamashita, Junichiro Mori, "Predicting Demographics and Personalities from Profile Images of Social Network Users using Convolutional Deep Neural Network", The 30th Annual Conference of the Japanese Society for Artificial Intelligence, 2016

SUMMARY OF THE INVENTION

Problems to be Solved by the Invention

In consideration thereof, an object of the present invention is to provide a character determination system and a character determination method which determine a character of an animal with a simple method.

Means for Solving the Problems

Through extensive studies carried out in order to solve the problem described above, the present inventors have found that the problem can be solved by a trained model having learned a relationship between an image of an animal and a character of the animal, culminating in completing the present invention.

Specifically, the present invention provides [1] to [11] below.

[1] A character determination system, including: receiving means which receives an input of an image of an animal; and character determining means which determines, using a trained model, a character of the animal from the image of the animal inputted to the receiving means, wherein the trained model is a trained model having learned a relationship between an image of an animal and a character of the animal.

[2] A character determination system, including: receiving means which receives an input of an image of an animal; and character determining means which determines, using a trained model, a character of the animal from the image of the animal inputted to the receiving means, wherein the trained model is a trained model which performs learning using an image of an animal and a label related to a character of the animal as training data and which receives an image of an animal as input and outputs a determination of the character of the animal.

[3] The character determination system according to [1] or [2], wherein an image of an animal received by the receiving means is an image obtained by photographing a face of the animal from front.

[4] The character determination system according to any one of [1] to [3], wherein the character includes friendliness or docility.

[5] The character determination system according to any one of [1] to [4], further including breed determining means which determines, using a trained model for breed determination, a breed of an animal from an image of the animal inputted to the receiving means.

[6] The character determination system according to [5], wherein the character determining means is provided with a plurality of trained models and the character determining means determines, using a trained model corresponding to a determination result of a breed by the breed determining means, a character of an animal from an image of the animal inputted to the receiving means.

[7] The character determination system according to [6], wherein the trained model is provided in plurality in accordance with a category into which a breed of an animal is categorized based an average weight of an adult of the breed.

[8] The character determination system according to any one of [1] to [7], wherein the trained model has been subjected to learning using, as training data, an image of an animal and a label related to a character of the animal of one or a plurality of specific breeds.

[9] A generation method of a trained model which determines a character of an animal from an image of the animal, the generation method including: inputting an image of an animal and a label related to a character of the animal to a computer as training data and causing an artificial intelligence to learn the training data.

[10] A character determination method, including: a step of preparing an image of an animal; and a step of inputting the image to a trained model and outputting a character determination of the animal from the inputted image of the animal by a computer using the trained model, wherein the trained model is a trained model having learned a relationship between an image of an animal and a character of the animal.

[11] A character determination method, including: a step of preparing an image of an animal; and a step of inputting the image to a trained model and outputting a character determination of the animal from the inputted image of the animal by a computer using the trained model, wherein the trained model is a trained model which performs learning using an image of an animal and a label related to a character of the animal as training data and which receives an image of an animal as input and outputs a determination of the character of the animal.

Effects of the Invention

According to the present invention, a character determination system and a character determination method which determine a character of an animal with a simple method can be provided.

MODE FOR CARRYING OUT THE INVENTION

<Character Determination System>

A character determination system according to the present embodiment includes: receiving means which receives an input of an image of an animal; and character determining means which determines, using a trained model, a character of the animal from the image of the animal inputted to the receiving means, wherein the trained model is a trained model having learned a relationship between an image of an animal and a character of the animal.

[Receiving Means]

Figure 1:
FIG. 1 is a diagram representing a preferable example of a facial image of an animal.
Figure 2:
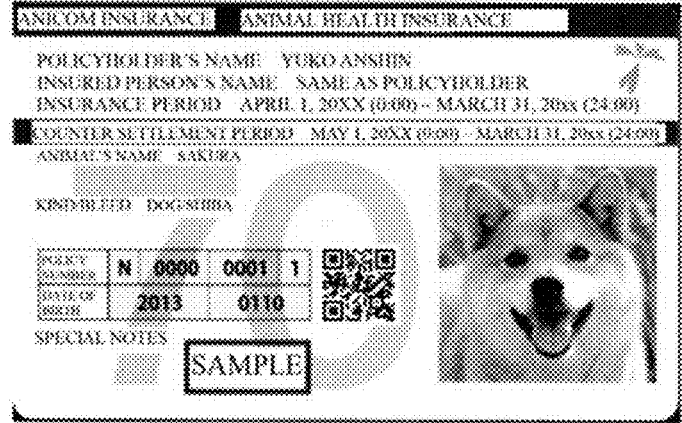
FIG. 2 is a diagram representing a preferable example of a facial image of an animal.

The receiving means is means which receives an input of an image of an animal. Examples of the animal include mammals such as dogs, cats, and rabbits and, preferably, the animal is a dog or a cat. As a reception method of the image, any method such as scanning, inputting image data, transmitting image data, and taking a picture on site, then loading an image may be adopted. A format of the image is not particularly limited and the image may be a still image or a moving image. While a part of the animal captured in the image is not particularly limited, the image of the animal is preferably an image showing a face of the animal, more preferably a photograph obtained by photographing the face of the animal from the front as shown in FIG. 1, and even more preferably a close-up of the face of the animal. As shown in FIG. 2, an image used on a health insurance card of the animal is also preferable. The image may be any of a black-and-white image, a grayscale image, and a color image. An image which does not show an entire face of an animal, an image in which shapes have been edited by image editing software, an image which shows a plurality of animals, an image in which a face appears too small to make out the eyes or the ears, or a blurry image are not preferable. Images subjected to normalization or images with unified resolutions are preferable.

[Character Determining Means]

The character determining means is means which determines, using a trained model, a character of an animal from an image of the animal inputted to the receiving means. In the present embodiment, the trained model is a trained model having learned a relationship between an image of an animal and a character of the animal. Preferably, the trained model is a trained model having learned a relationship between an image of an animal and a character of the animal for each species or each breed. The trained model used by the character determining means may be a trained model generated for each character or a trained model having learned a relationship between a plurality of character items and an image. Alternatively, the trained model used by the character determining means may be a trained model having learned a relationship between an image and a character with respect to an animal of a specific age group among segmented age groups such as a trained model having learned a relationship between an image and a character with respect to a young-aged animal (less than one year old) or a trained model which accommodates all age groups.

A character refers to, for example, qualities which are manifested in propensity or behavior of an individual animal. While a character of a human being includes inner traits such as a way of thinking or sensitivity, since it is difficult to comprehend inner traits of animals, a propensity or a quality which is manifested in the behavior of the animal is preferable.

Types of characters are not particularly limited. Examples of types of characters include friendliness (friendly/not friendly), docility (docile/active), nervousness (nervous/easygoing), sociability (sociable/introverted), bravery (timid/brave), flexibility (stubborn/flexible), resilience (tendency to dwell/quick to switch mindset), positiveness (withdrawn/positive), dependency (needy/independent-minded), strength of personality (strong-willed/faint-hearted), aggression (aggressive/not aggressive), tendency to bark (tends to bark/does not tend to bark), and patience (patient/impatient).

Among animals, dogs are known to have 13 items of behavioral characteristics (temperaments) regarding sociality in relation to C-barq (Canine Behavioral Assessment and Research Questionnaire), a behavioral evaluation system for dogs developed by James Serpell of the University of Pennsylvania, and the behavioral characteristics can also be used as characters. The behavioral characteristics according to C-barq are also used in "2016 Research into Assessment Methods etc. Related to Ideal Time of Separating Young Individual Dogs and Cats from Litter" carried out by the Japan Veterinary Medical Association commissioned by Ministry of the Environment. The 13 items of behavioral characteristics are aggression, fear, separation anxiety, touch sensitivity, trainee, chasing, excitability, attachment/attention seeking, and energy.

Examples of determining a character include predicting or inferring a character. Another example is determining a category which a character belongs to among categories of characters set in advance. Yet another example is determining a tendency for each item related to a character. The determination may be a stage assessment based on strength of a tendency for each item of a character.

The trained model such as that described above which is used in the character determining means can be generated by supervised learning or unsupervised learning. Examples of training data in the case of supervised learning include an image of an animal and data or a label related to a character of the animal. Training data may be created by attaching a tag or a label in accordance with the character of the animal to the image of the animal.

A format of an image of an animal to be used as training data is not particularly limited. The image may be a still image or a moving image. While a part of the animal captured in the image is not particularly limited, the image of the animal is preferably an image showing a face of the animal, more preferably a photograph obtained by photographing the face of the animal from the front, and even more preferably a close-up of the face of the animal such as that shown in FIG. 1. As shown in FIG. 2, an image used on a health insurance card of the animal may be used. The image may be any of a black-and-white image, a grayscale image, and a color image. An image which does not show an entire face of an animal, an image in which shapes have been edited by image editing software, an image which shows a plurality of animals, an image in which a face appears too small to make out the eyes or the ears, or a blurry image are not preferable. Images subjected to normalization or images with unified resolutions are preferable. More preferably, a resolution of the image used in the training data and a resolution of an image received by the receiving means are unified.

A character of an animal captured in an image to be used as training data can be obtained from, for example, a pet owner of the animal or the animal's regular veterinarian. Methods of obtaining the character include a questionnaire and information provided when filling out a pet insurance form.

The trained model is preferably an artificial intelligence (AI). An artificial intelligence (AI) refers to software or a system which replicates intelligent operations carried out by the human brain with a computer and, specifically, refers to a computer program or the like which understands natural language used by humans, performs logical inference, and learns from experience. The artificial intelligence may be either an artificial general intelligence or an artificial narrow intelligence and, more specifically, any of known artificial intelligences such as a multi-layer perceptron, a recurrent neural network, a deep neural network, and a convolutional neural network, and open source software can be used.

The artificial intelligence is subjected to learning in order to generate the trained model. While the learning may be either machine learning or deep learning, deep learning is preferable. Deep learning is an evolution of machine learning and a feature thereof is that a feature amount is automatically extracted.

A learning method for generating the trained model is not particularly limited and open source software or libraries can be used. The learning method may be transfer learning. For example, DIGITS (the Deep Learning GPU Training System) made available by NVIDIA can be used. In addition, for example, MobileNet or EfficientNet can be used as the artificial intelligence (neural network) and a trained model can be generated by transfer learning using Pytorch as a machine learning library (deep learning library). Otherwise, for example, known support vector machines made public in "An Introduction to Support Vector Machines and Other Kernel-based Learning Methods" (Kyoritsu Shuppan Co., Ltd.) may be used.

[Breed Determining Means]

The character determination system according to the present invention preferably further includes breed determining means. The breed determining means is means which determines, using a trained model for breed determination, a breed of an animal from an image of the animal inputted to the receiving means.

In the case of human beings, since there is no significant difference in positions or shapes of features (for example, eyes, nose, and mouth) of faces, there is no reason for providing breed determining means. However, due to breed improvement carried out by humans on pets, the positions or shapes of features of faces often differ significantly from one breed to the next. Therefore, providing the breed determining means in front of the character determining means enables a character to be determined with greater accuracy.

Details of an image related to the breed determining means are similar to those of the character determining means described above.

The trained model for breed determination is a trained model having learned a relationship between an image of an animal and a breed of the animal. Preferably, the trained model for breed determination includes a trained model which performs learning using an image of an animal and a breed of the animal as training data and which receives an image of an animal as input and outputs a determination of the breed of the animal. Details of an image of an animal for training data are similar to those of the character determining means described above. In addition, the trained model for breed determination is similar to the trained model in the character determining means described above with the exception of learning a relationship between an image of an animal and a breed of the animal. Algorithms, software, libraries, and learning methods that differ from the trained model in the character determining means described above may be used or the same algorithms, software, libraries, and learning methods may be used.

A breed is a unit of a group of organisms under the species of the organisms. For example, in the case of dogs, a breed of dogs is also called a dog breed and specific examples thereof include toy poodle, Chihuahua, miniature dachshund, shiba, Pomeranian, Yorkshire terrier, miniature schnauzer, shih tzu, French bulldog, papillon, Maltese, Labrador retriever, Dalmatian, and chow chow. In the case of cats, a breed of cats is also called a cat breed and specific examples thereof include Scottish fold, American shorthair, Norwegian forest cat, Russian blue, British shorthair, ragdoll, Maine coon, and Persian. Examples of breeds of rabbits include Netherland dwarf, Holland lop, lop-eared, mini rex, dwarf lop, and American fuzzy lop.

The character determination system according to the present invention is preferably provided with a plurality of trained models as the character determining means and the character determining means preferably determines, using a trained model corresponding to a determination result of a breed by the breed determining means and breed-related information inputted at the same time as the reception of an image by the receiving means, a character of the animal from the image of the animal inputted to the receiving means. In particular, when the character determination system according to the present invention is provided with breed determining means, preferably, a breed of an animal is determined from an image of the animal inputted to the receiving means and a character determination is performed using a corresponding trained model in the character determining means based on the determination result.

As a trained model corresponding to a breed, a trained model having performed learning using, as training data, an image of an animal related to one or a plurality of specific breeds and a label related to a character of the animal is preferably used. For example, the trained model performs learning using images of animals of only specific breeds and labels related to a character of the animals. The images of animals of only specific breeds in this case may be images of one breed such as toy poodle or images of a plurality of breeds such as toy poodle, Pomeranian, and miniature dachshund. In addition, in the case of a plurality of breeds, a configuration may be adopted in which breeds are categorized into categories and a trained model is provided for each category such as a trained model for large breeds having performed learning using images of large breeds, a trained model for medium-sized breeds having performed learning using images of medium-sized breeds, a trained model for small breeds having performed learning using images of small breeds, and a trained model for miniature breeds having performed learning using images of miniature breeds. As categories, for example, in the case of dogs, dogs can be categorized according to average weight such as classifying breeds of which an average weight of an adult dog is less than 4 kg as miniature breeds, breeds with an average weight of an adult dog ranging from 4 to 10 kg as small breeds, breeds with an average weight of an adult dog ranging from 10 to 25 kg as medium-sized breeds, and breeds with an average weight of 25 kg or more as large breeds. Otherwise, breeds can be categorized according to body height, body length, and genetic relationships.

As described above, more accurate character determination can be performed by using a trained model corresponding to a breed or categorizing (classifying) breeds according to size or weight and using a trained model corresponding to each category. While a reason why such an effect is produced is unclear, one conceivable reason is that each breed has a characteristic tendency unique to the breed and, with respect to size-wise categories, small dogs have a characteristic tendency unique to small dogs and large dogs have a characteristic tendency unique to large dogs.

[Output]

When the character determining means receives an image of an animal as input information, a determination of a character of the animal is performed using the trained model.

A format of output of a determination result is not particularly limited and examples include displaying, on a screen of a personal computer, types of character such as "friendly", "docile", and "active" or preparing a plurality of items of character and displaying a tendency by a score or a percentage for each item. In a specific example, a score of friendliness is 4 out of 5 points (the higher the score, the tendency to be more friendly), a score of docility is 2 out of 5 points (the higher the score, the tendency to be more docile), and a score of nervousness is 1 out of 5 points (the higher the score, the tendency to be more nervous).

The character determination system according to the present invention may separately include output means which receives a determination result from the character determining means and which outputs the determination result.

Hereinafter, an embodiment of the character determination system according to the present invention will be described with reference to FIG. 3.

Figures 3, 4:
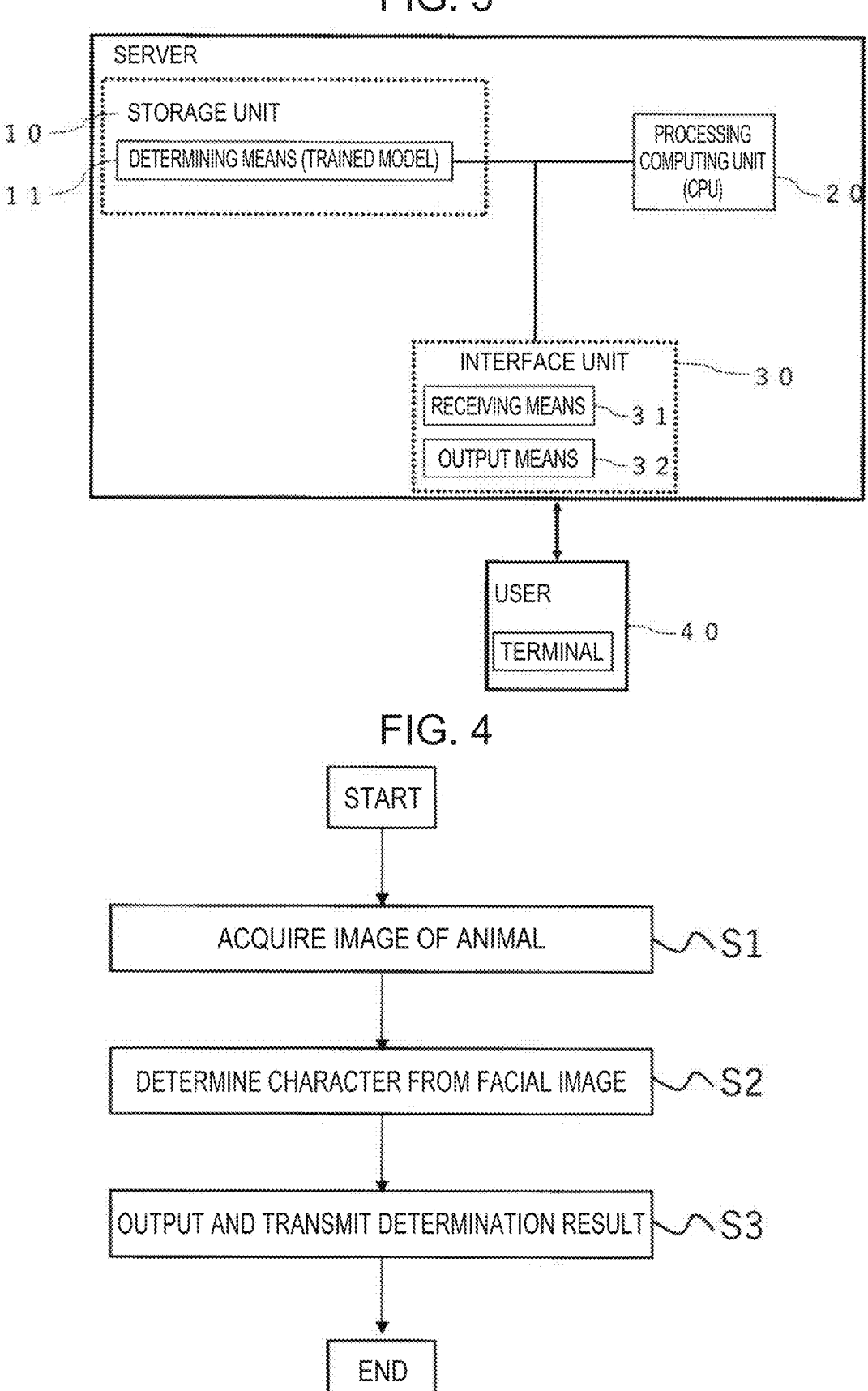
FIG. 3 is a schematic configuration diagram representing an embodiment of a character determination system according to the present invention.
FIG. 4 is a flow chart representing an example of a flow of character determination by the character determination system according to the present invention.

In FIG. 3, a terminal 40 is a terminal used by a user. The user is a rearer who wishes to get to know the character of a pet being reared by the rearer, a consumer who wishes to get to know the character of a pet which the consumer is considering purchasing, or a pet shop or a breeder who wishes to comprehend the character of an animal to be posted on a website. Examples of the terminal 40 include a personal computer, a smartphone, and a tablet terminal. The terminal 40 is configured to include a processing unit such as a CPU, a storage unit such as a hard disk, a ROM, or a RAM, a display unit such as a liquid crystal panel, an input unit such as a mouse, a keyboard, or a touch panel, and a communicating unit such as a network adapter.

The user accesses a server from the terminal 40 and inputs and transmits an image (photograph) of an animal and information such as a type, a breed, a gender, and a weight of the animal. A mode may be adopted in which the user takes a photograph or a video of an animal to be an object using a camera of a smartphone on the spot while using the present character determination system and the user inputs and transmits the photograph or the video. For example, the user takes a headshot of the animal to be an object according to instructions displayed on a screen of the terminal 40 and, once a suitable photograph is obtained, the user transmits the photograph to the server. The server may be configured so as to separately include photography assisting means constituted of an image determination program, wherein the photography assisting means determines whether or not the photograph is a photograph suitable for character determination such as the photograph representing a captured image of an entire face of the animal or the photograph being a photograph taken from the front of the face of the animal and conveys a determination result thereof to the user through an interface or a terminal.

In addition, the user can receive a result of a character determination by the server by accessing the server with the terminal 40.

While the server is constituted of a computer in the present embodiment, the server may be any kind of apparatus insofar as the server has the functions according to the present invention. The server may be a server on the cloud.

A storage unit 10 is constituted of, for example, a ROM, a RAM, or a hard disk. The storage unit 10 stores an information processing program for operating the respective units of the server and, in particular, the storage unit 10 stores character determining means (trained model) 11.

The character determining means (trained model) 11 receives an image of an animal to be an object having been inputted by the user as input and outputs a character determination of the animal included in the image. For example, the character determining means (trained model) 11 according to the present embodiment is configured to include a deep neural network or a convolutional neural network.

A processing computing unit 20 executes character determination using the character determining means (trained model) 11 stored in the storage unit.

An interface unit (communicating unit) 30 includes receiving means 31 and output means 32, receives an image of an animal and other information from the terminal of the user, and outputs a result of a character determination with respect to the terminal of the user.

With the character determination system according to the present embodiment, by uploading a photograph or a video of a pet to the server, the user can easily obtain a determination of a character of the pet.

While a mode in which the character determining means and the receiving means are stored in a server and connected to the terminal of the user by connecting means such as the Internet or a LAN has been described in the present embodiment, the present invention is not limited thereto and a mode in which the character determining means, the receiving means, and the interface unit are stored in a single server or an apparatus or a mode which does not separately require a terminal used by the user may be adopted.

FIG. 4 shows a flow chart of character determination based on an embodiment of the character determination system according to the present invention. The user inputs basic information such as a type, an age, and a gender of an animal to be an object and uploads an image of the animal to the receiving means (step S1). The processing computing unit of the server uses the character determining means (trained model) to determine a character of the animal from the uploaded image (step S2). The output means outputs a derived determination result by displaying on a screen or the like and presents the determination result to the user (step S3).

<Embodiment Including Breed Determining Means>

Hereinafter, an embodiment including breed determining means of the character determination system according to the present invention will be described with reference to FIG. 5.

Figure 5:
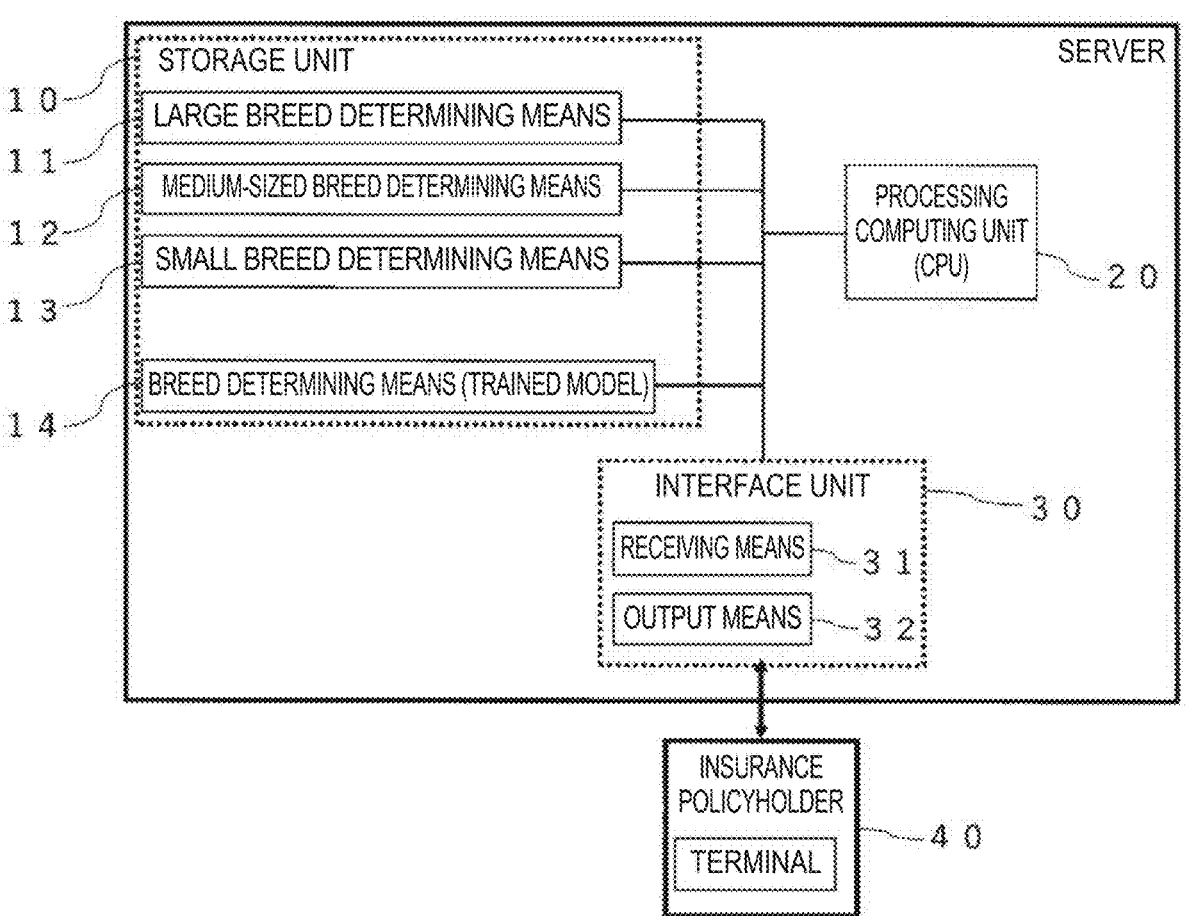
FIG. 5 is a schematic configuration diagram representing an embodiment of a character determination system according to the present invention.

The character determination system shown in FIG. 5 is similar to the embodiment described above with the exception of the storage unit 10 storing, as the character determining means, large breed character determining means 11 (a trained model having learned a relationship between an image of an animal and a character of the animal with respect to large breeds), medium-sized breed character determining means 12 (a trained model having learned a relationship between an image of an animal and a character of the animal with respect to medium-sized breeds), small breed character determining means 13 (a trained model having learned a relationship between an image of an animal and a character of the animal with respect to small breeds), and breed determining means 14 (trained model for breed determination).

In the character determination system according to the embodiment, when an image of an animal is inputted to the receiving means 31, the breed determining means 14 determines a breed of the animal. The determination of a breed may be a determination of a specific breed name or a determination related to a category such as a large breed, a medium-sized breed, or a small breed.

The character determining means (trained model) used for character determination is selected based on the determination result by the breed determining means 14. A program or software which selects an optimal trained model from a plurality of trained models in accordance with a breed or a breed category may be provided. For example, when the image of the animal inputted to the receiving means is determined to be an image of a large breed, the large breed character determining means 11 is selected and the large breed character determining means 11 determines the character of the animal using the trained model having learned a relationship between an image of the animal and the character of the animal for a large breed.

While a configuration premised on using a single character determination system for each species such as for dogs and for cats is adopted in the present embodiment, a character determination system which accommodates animals of a plurality of species may be used. In this case, breed determining means which determines a species of an animal from an image of the animal is preferably provided and a plurality of character determining means (trained models) for each species and each breed are preferably provided.

Figure 6:
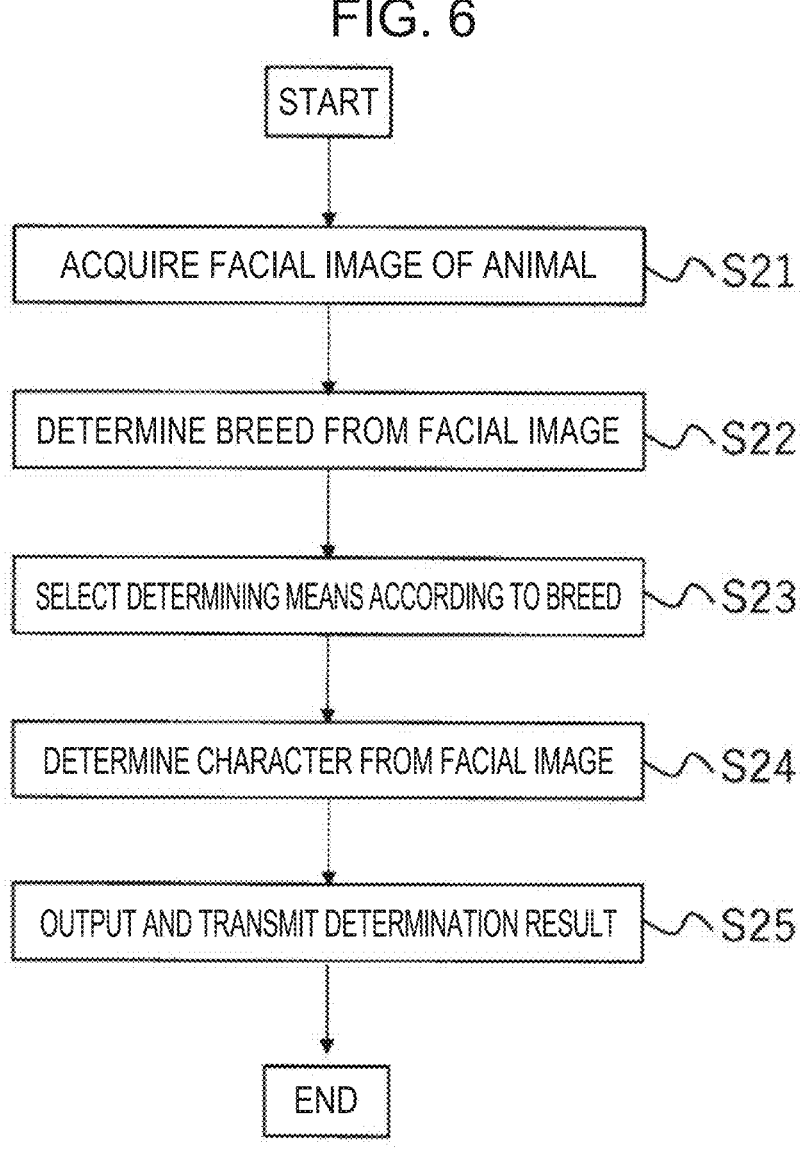
FIG. 6 is a flow chart representing an example of a flow of character determination by the character determination system according to the present invention.

FIG. 6 shows a flow chart of character determination based on an embodiment when the character determination system according to the present invention is provided with breed determining means. The user inputs basic information such as a type of an animal to be an object and uploads an image of the animal to the receiving means (step S21). The processing computing unit of the server uses breed determining means (trained model) to determine a breed of the animal from the uploaded image (step S22). Next, character determining means (trained model) in accordance with the breed is selected (step S23) and a character of the animal is determined from the image of the animal by the selected character determining means (trained model) (step S24). The output means outputs a derived determination result by displaying on a screen or the like and presents the determination result to the user (step S25).

In addition, while a configuration which includes breed determining means and which receives an image of an animal of which a breed is unknown, performs breed determination by the breed determining means, and subsequently performs character determination using an appropriate trained model is adopted in the present embodiment, alternatively, a configuration which does not include the breed determining means and which receives information related to a breed from the user when accepting an image with the receiving means, selects an appropriate trained model based on the information related to the breed, and performs character determination may be adopted.

<Character Determination Method>

A character determination method according to the present invention is a character determination method including: a step of preparing an image of an animal; and a step of inputting the image to a trained model and outputting a character determination of the animal from the inputted image of the animal by a computer using the trained model, wherein the trained model is a trained model having learned a relationship between an image of an animal and a character of the animal.

In addition, a character determination method according to another aspect of the present invention is a character determination method including: a step of preparing an image of an animal; and a step of inputting the image to a trained model and outputting a character determination of the animal from the inputted image of the animal by a computer using the trained model, wherein the trained model is a trained model which performs learning using an image of an animal and a label related to a character of the animal as training data and which receives an image of an animal as input and outputs a character determination of the animal.

Images of an animal and trained models are similar to those in the character determination system according to the present invention described above.

EXAMPLES

[Character Determining Means (Trained Model for Character Determination)]

Headshots of dogs (toy poodle, Chihuahua, golden retriever, and Shetland sheepdog) were prepared as training data. The headshots were trimmed (segmented) to create images including an entire head.

Tags related to a character obtained by a questionnaire with respect to pet owners were attached to each headshot. The questionnaire asked about friendliness and docility, answers were categorized into friendly/not friendly and docile/not docile, and tags respectively corresponding to the answers were attached to the facial images. Learning was performed by dividing ages of dogs into a group of all ages (age 0 to age 19) and a group aged 1 or younger. The number of individuals (number of images) used in training data was as described in Table 1 below.

TABLE 1

| Breed | Item | Age | Behavioral category | Number of learned individuals |
|---|---|---|---|---|
| Toy poodle | Friendliness | All ages | Friendly | 1125 |
| | | | Other than above | 322 |
| | | Aged 1 or younger | Friendly | 686 |
| | | | Other than above | 135 |
| | Docility | All ages | Docile | 948 |
| | | | Other than above | 499 |
| | | Aged 1 or younger | Docile | 517 |
| | | | Other than above | 304 |
| Chihuahua | Friendliness | All ages | Friendly | 720 |
| | | | Other than above | 524 |
| | | Aged 1 or younger | Friendly | 447 |
| | | | Other than above | 241 |
| | Docility | All ages | Docile | 741 |
| | | | Other than above | 503 |
| | | Aged 1 or younger | Docile | 407 |
| | | | Other than above | 281 |
| Golden retriever | Friendliness | All ages | Friendly | 454 |
| | | | Other than above | 35 |
| | | Aged 1 or younger | Friendly | 214 |
| | | | Other than above | 15 |
| | Docility | All ages | Docile | 254 |
| | | | Other than above | 109 |
| | | Aged 1 or younger | Docile | 153 |
| | | | Other than above | 76 |
| Shetland sheepdog | Friendliness | All ages | Friendly | 93 |
| | | | Other than above | 37 |
| | | Aged 1 or younger | Friendly | 63 |
| | | | Other than above | 23 |
| | Docility | All ages | Docile | 96 |
| | | | Other than above | 34 |
| | | Aged 1 or younger | Docile | 60 |
| | | | Other than above | 25 |

Deep learning was performed using the headshots and a trained model for character determination was generated for each breed (toy poodle, Chihuahua, golden retriever, and Shetland sheepdog) and each character.

Transfer learning using EfficientNet as an artificial intelligence (neural network) was adopted as a learning method and Pytorch was used as a machine learning library (deep learning library).

[Breed Determining Means (Trained Model for Breed Determination)]

400 images were prepared for each of the breeds of toy poodle, Chihuahua, Pomeranian, Yorkshire terrier, miniature schnauzer, papillon, Maltese, shih tzu, miniature dachshund, shiba, cavalier King Charles spaniel, pug, French bulldog, Welsh corgi Pembroke, golden retriever, and Labrador retriever, and supervised learning was performed to generate a trained model for breed determination.

Transfer learning using MobileNetNetV3-Large as an artificial intelligence (neural network) was adopted as a learning method and Pytorch was used as a machine learning library (deep learning library).

Using the obtained trained models, tests were performed using 150 images for each breed.

Table 2 below shows a percentage of correct answers for each breed.

TABLE 2

| | test | Percentage of correct answers | Size |
|---|---|---|---|
| 1 | Toy poodle | 94.7% | Miniature |
| 2 | Chihuahua | 91.3% | Miniature |
| 3 | Pomeranian | 94.0% | Miniature |
| 4 | Yorkshire terrier | 97.3% | Miniature |
| 5 | Miniature schnauzer | 93.3% | Miniature |
| 6 | Papillon | 95.3% | Miniature |
| 7 | Maltese | 94.7% | Miniature |
| 8 | Shih tzu | 94.7% | Small |
| 9 | Miniature dachshund | 91.3% | Small |
| 10 | Shiba | 97.3% | Small |
| 11 | Cavalier King Charles spaniel | 98.0% | Small |
| 12 | Pug | 98.0% | Small |
| 13 | French bulldog | 97.3% | Medium-sized |
| 14 | Welsh corgi Pembroke | 96.7% | Medium-sized |
| 15 | Golden retriever | 93.3% | Large |
| 16 | Labrador retriever | 98.0% | Large |
| | Average | 96.1% | |

Example 1

A character determination of Shetland sheepdogs was performed using a trained model for character determination. Images that differ from images used in training data were prepared as the images of a Shetland sheepdog used for character determination. With respect to the trained model having been learned using photographs of Shetland sheepdogs of all ages, character determination was performed using photographs of animals of all ages, and with respect to the trained model having been learned using photographs of Shetland sheepdogs aged 1 or younger, character determination was performed using photographs of Shetland sheepdogs aged 1 or younger. The images used in character determination were images (hereinafter, referred to as "character-linked images") of dogs known to be friendly and docile in advance according to answers to the questionnaire having been provided by the pet owners. A determination result by the trained models matching an answer to the questionnaire by a pet owner was considered as a correct answer.

Results are shown in Table 3 below.

TABLE 3

| Breed | Item | Age | Number of correct answers | Total number | Percentage of correct answers |
|---|---|---|---|---|---|
| Shetland sheepdog | Friendliness | All ages | 13 | 23 | 0.63 |
| | | Aged 1 or younger | 7 | 16 | 0.52 |
| | Docility | All ages | 16 | 25 | 0.71 |
| | | Aged 1 or younger | 11 | 16 | 0.67 |

Example 2

A breed determination of images of dogs was performed using a trained model for breed determination. The images of dogs included character-linked images of toy poodles, Chihuahuas, and golden retrievers. As a result of the breed determination, character determination was performed using the trained model for character determination with respect to images determined to be toy poodles, Chihuahuas, or golden retrievers. In a similar manner to Example 1, a determination result by the trained models matching an answer to the questionnaire by a pet owner was considered as a correct answer. Results are shown in Table 4 below.

TABLE 4

| Breed | Item | Age | Number of correct answers | Total number | Percentage of correct answers |
|---|---|---|---|---|---|
| Toy poodle | Friendliness | All ages | 228 | 282 | 0.81 |
| | | Aged 1 or younger | 150 | 172 | 0.87 |
| | Docility | All ages | 178 | 237 | 0.75 |
| | | Aged 1 or younger | 87 | 130 | 0.67 |
| Chihuahua | Friendliness | All ages | 110 | 180 | 0.62 |
| | | Aged 1 or younger | 57 | 112 | 0.57 |
| | Docility | All ages | 93 | 185 | 0.56 |
| | | Aged 1 or younger | 51 | 102 | 0.54 |

TABLE 4-continued

| Breed | Item | Age | Number of correct answers | Total number | Percentage of correct answers |
|---|---|---|---|---|---|
| Golden retriever | Friendliness | All ages | 42 | 82 | 0.66 |
| | | Aged 1 or younger | 34 | 54 | 0.76 |
| | Docility | All ages | 35 | 64 | 0.64 |
| | | Aged 1 or younger | 20 | 39 | 0.6 |

The invention claimed is:

1. A character determination system, comprising:
receiving means which receives an input of an image of an animal other than a human; and character determining means which determines, using a machine learning or a deep learning trained model, a character of the animal from the image of the animal inputted to the receiving means, and
a processor configured to:
determine behavioral characteristics of the animal; and
determine the character based on a strength of a tendency for each of the behavioral characteristics that are determined;
wherein
the character includes friendliness, and
wherein the trained model has been subjected to learning using, as training data, an image of the animal and a label related to the character of one or more specific breeds to learn a relationship between the image of the animal other than a human and the character of the animal.

2. The character determination system according to claim 1, wherein the character includes behavioral characteristics defined in C-barq (Canine Behavioral Assessment and Research Questionnaire).

3. The character determination system according to claim 1, wherein the trained model of the character determining means is the trained model which performs learning using the image of an animal other than the human and the label related to the character of the animal as training data and which receives the image of an animal as input and outputs the character determination of the animal.

4. The character determination system according to claim 1, wherein the image of the animal received by the receiving means is an image obtained by photographing a face of the animal from front.

5. A character determination system, comprising:
receiving means which receives an input of an image of an animal other than a human; and character determining means which determines, using a machine learning or deep learning trained model, a character of the animal from the image of the animal inputted to the receiving means, and
a processor configured to:
determine behavioral characteristics of the animal; and
determine the character based on a strength of a tendency for each of the behavioral characteristics that are determined;
wherein
the trained model is a trained model having learned a relationship between an image of an animal other than a human and a character of the animal, and
the character determination system further comprises breed determining means which determines, using the machine learning or deep learning trained model for breed determination, a breed of an animal from an image of the animal inputted to the receiving means.

6. The character determination system according to claim 5, wherein the character determining means is provided with a plurality of trained models, and the character determining means determines, using one of the plurality of trained models corresponding to the determination result of the breed determining means, the character of the animal in the input image.

7. The character determination system according to claim 6, wherein the trained model is provided in plurality in accordance with a category into which a breed of an animal is categorized based an average weight of an adult of the breed.

8. The character determination system according to claim 5, wherein the trained model of the character determining means is a trained model which performs learning using an image of an animal other than a human and a label related to a character of the animal as training data and which receives an image of an animal as input and outputs a character determination of the animal.

9. The character determination system according to claim 5, wherein an image of an animal received by the receiving means is an image obtained by photographing a face of the animal from front.

10. The character determination system according to claim 5, wherein the character includes behavioral characteristics defined in C-barq (Canine Behavioral Assessment and Research Questionnaire).

11. The character determination system according to claim 5, wherein the trained model has been subjected to learning using, as training data, an image of an animal and a label related to a character of the one or more specific breeds.

12. The character determination system according to claim 3, wherein the trained model has been subjected to learning using, as training data, an image of an animal and a label related to a character of the one or more specific breeds.

13. The character determination system according to claim 4, wherein the trained model has been subjected to learning using, as training data, an image of an animal and a label related to a character of the one or more specific breeds.

14. The character determination system according to claim 6, wherein the trained model has been subjected to learning using, as training data, an image of an animal and a label related to a character of the one or more specific breeds.

15. A generation method of a machine learning or deep learning trained model which determines a character of an animal other than a human from an image of the animal, the generation method including: inputting an image of an animal other than a human and a label related to a character of the animal to a computer as training data and causing an artificial intelligence to learn the training data, wherein
the character includes friendliness.

16. A character determination method, comprising:
a step of preparing an image of an animal other than a human; and
a step of inputting the image to a machine learning or deep learning trained model and outputting a character determination of the animal from the inputted image of the animal by a computer using the machine learning or deep learning trained model, wherein
the machine learning or deep learning trained model is a trained model having learned a relationship between an image of an animal other than a human and a character of the animal, and
the character includes friendliness.

17. The case determination method according to claim 16, wherein the trained model is a trained model which performs learning using an image of an animal other than a human and a label related to a character of the animal as training data and which receives an image of an animal as input and outputs a character determination of the animal.

18. A character determination method, comprising:
a step of preparing an image of an animal other than a human; and
a step of breed determining a breed of an animal from an image of the animal inputted to the receiving means by a computer using a machine learning or deep learning trained model for breed determination; and
a step of outputting a character determination of the animal from the inputted image of the animal by the computer using the machine learning or deep learning trained model, where
the machine learning or deep learning trained model is a trained model having learned a relationship between an image of an animal other than a human and a character of the animal.

* * * * *